US009511250B2

(12) United States Patent
Neal

(10) Patent No.: US 9,511,250 B2
(45) Date of Patent: Dec. 6, 2016

(54) EXERCISE SUSPENSION APPARATUS

(71) Applicant: Jonathan Neal, Kansas City, MO (US)

(72) Inventor: Jonathan Neal, Kansas City, MO (US)

(*) Notice: Subject to any disclaimer, the term of this patent is extended or adjusted under 35 U.S.C. 154(b) by 0 days.

(21) Appl. No.: 14/750,132

(22) Filed: Jun. 25, 2015

(65) Prior Publication Data
US 2015/0375027 A1    Dec. 31, 2015

Related U.S. Application Data

(60) Provisional application No. 62/017,652, filed on Jun. 26, 2014.

(51) Int. Cl.
A63B 21/002    (2006.01)
A63B 21/00    (2006.01)
A63B 23/12    (2006.01)

(52) U.S. Cl.
CPC ....... *A63B 21/0023* (2013.01); *A63B 21/1465* (2013.01); *A63B 21/1476* (2013.01); *A63B 21/4017* (2015.10); *A63B 21/4019* (2015.10); *A63B 23/1236* (2013.01)

(58) Field of Classification Search
CPC ............ A63B 21/0023; A63B 21/0004; A63B 21/00047; A63B 21/4017; A63B 21/4021; A63B 23/0205; A63B 23/0211; A63B 23/035; A63B 23/1209; A63B 23/1236; A63B 2023/006; A63B 21/4011; A63B 21/4013; A63B 21/4015; A63B 21/4019; A63B 21/065
See application file for complete search history.

(56) References Cited

U.S. PATENT DOCUMENTS

| 5,328,434 | A | * | 7/1994 | Carroll | A63B 23/0211 |
| | | | | | 482/140 |
| 5,607,380 | A | | 3/1997 | Duty | |
| 7,468,025 | B2 | | 12/2008 | Hauser et al. | |
| 7,621,858 | B2 | | 11/2009 | Sheron | |
| 8,888,668 | B2 | | 11/2014 | Delisle | |
| 9,308,416 | B1 | * | 4/2016 | Oliverio | A63B 23/1236 |
| 2004/0266593 | A1 | | 12/2004 | Schwendeman | |
| 2006/0014615 | A1 | | 1/2006 | Godbold | |
| 2011/0275499 | A1 | * | 11/2011 | Eschenbach | A63B 21/00181 |
| | | | | | 482/141 |

OTHER PUBLICATIONS

International Search Report and Written Opinion, PCT/US2015/037669, dated Sep. 14, 2015.

* cited by examiner

*Primary Examiner* — Oren Ginsberg
*Assistant Examiner* — Megan Anderson
(74) *Attorney, Agent, or Firm* — Polsinelli PC

(57) ABSTRACT

Aspects of the present disclosure involve an exercise device including a base member, a pair of tower members, and a strap. The base member includes a substantially planar bottom surface, a top surface opposite the bottom surface, and an opening extending through the top and bottom surfaces. The pair of tower members extends upward from opposite ends of the top surface of the base member. The strap releasably secures to each of the pair of tower members at a chosen height and with a chosen amount of slack. The strap includes a handle positioned between a first end and a second end of the strap, wherein the chosen amount of slack of the strap is adjustable by coupling the strap to each of the pair of tower members at different positions on the strap.

20 Claims, 9 Drawing Sheets

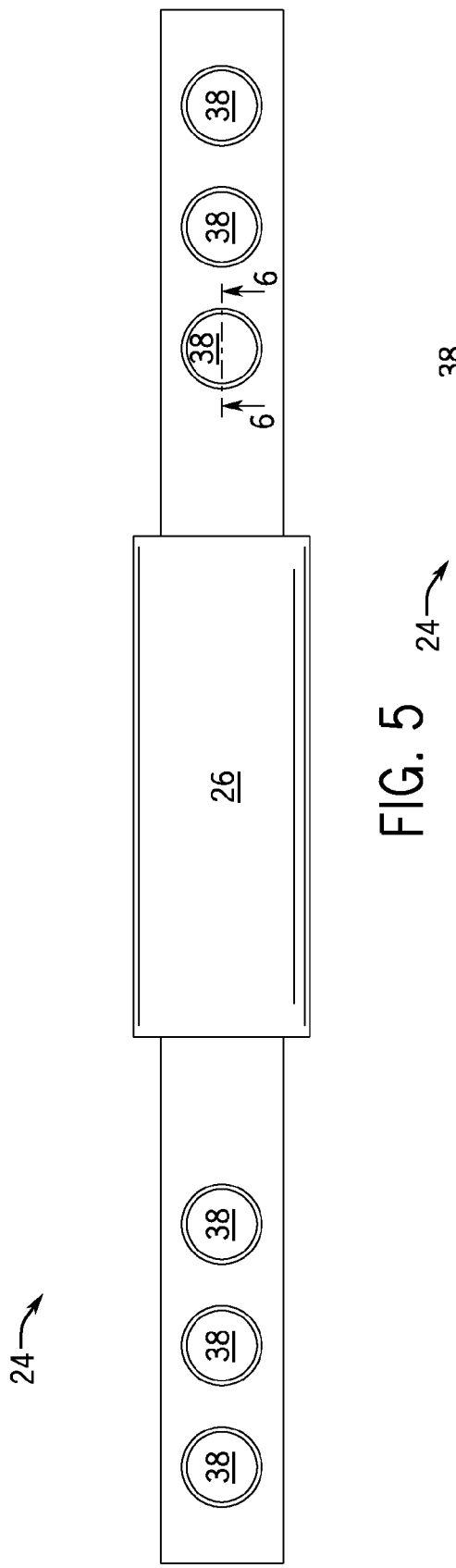
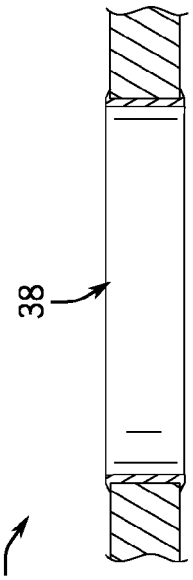
FIG. 5
FIG. 6

EXERCISE SUSPENSION APPARATUS

CROSS-REFERENCE TO RELATED APPLICATIONS

The present application claims priority under 35 U.S.C. §119 to U.S. Provisional Patent Application 62/017,652, which was filed Jun. 26, 2014, entitled "EXERCISE SUSPENSION APPARATUS," and is hereby incorporated by reference in its entirety into the present application.

TECHNICAL FIELD

Aspects of the present disclosure involve exercise equipment, and, more particularly involve exercise equipment for stability training.

BACKGROUND

Exercise equipment may be designed with various aspects in mind to achieve a particular goal. For example, certain equipment may be designed to isolate and target specific muscle groups while other equipment may be designed to engage multiple muscle groups at the same time. One type of exercise equipment that is popular for rehabilitative purposes, among other purposes, is equipment with integrated instability. While just about any piece of exercise equipment requires a user to stabilize their body relative to the piece of equipment, exercise equipment with integrated instability adds an element of instability to the exercise that would otherwise not be present but for the added instability. Examples of instability training include any number of exercises using a yoga ball as a support (e.g., dumbbell press, sit-ups). In these situations, the yoga ball supports a user's upper body, but the ball is not in a fixed position. Rather, the ball is free to move around based on changes in the user's center of gravity. Thus, as the user moves his or her center of gravity relative to the yoga ball during the exercise, the user is forced to use stabilizing core muscles (e.g., abs) to counteract the center of gravity being offset from a central point of the yoga ball. The user benefits from the core muscle workout as well as from the original exercise (e.g., dumbbell press, sit-ups).

With these thoughts in mind, among others, aspects of the exercise suspension apparatus, disclosed herein, were conceived.

SUMMARY

Aspects of the present disclosure involve an exercise suspension apparatus that includes a base member, a first and second tower member, a first and second pin member, and a strap configured to be coupled between the first and the second tower members. The base member includes a top surface and a bottom surface and an edge extending between the top surface and the bottom surface. The first and second tower members extend upward from the top surface of the base member and the first tower member includes a first slot extending through a first width of the first tower member. The second tower member includes a second slot extending through a second width of the second tower member. The first and second pin members include a head portion and a neck portion extending from the head portion. The first pin member is removably secured within a first opening on a top portion of the first tower member and the second pin member is removably secured within a second opening on a top portion of the second tower member. The strap includes a first end and a second end opposite the first end and a plurality of through holes extending through the strap. The first end of the strap is configured to be deployed through the first slot and supported by the first tower member via the first pin member engaging with the first tower member and with one of the plurality of through holes. The second end of the strap is configured to be deployed through the second slot and supported by the second tower member via the second pin member engaging with the second tower member and with another one of the plurality of through holes. An amount of slack associated with the strap may be adjusted by engaging either the first pin member or the second pin member with differing through holes of the plurality of through holes extending through the strap.

Aspects of the present disclosure involve an exercise device including a base member, a first and second tower member, a first and second pin member, and a strap. The base member may include a top surface and a bottom surface and an edge extending between the top surface and the bottom surface. The first and second tower members may extend upward from the top surface of the base member, the first tower member may include a first slot extending through a first width of the first tower member, the second tower member may include a second slot extending through a second width of the second tower member. Each pin member may include a head portion and a neck portion extending from the head portion, the first pin member may be removably secured within a first opening on a top portion of the first tower member, the second pin member may be removeably secured within a second opening on a top portion of the second tower member. The strap may include a first end and a second end opposite the first end and a plurality of through holes extending through the strap, the first end of the strap may be configured to be inserted through the first slot and supported by the first tower member via the first pin member engaging with the first tower member and with one of the plurality of through holes, the second end of the strap may be configured to be inserted through the second slot and supported by the second tower member via the second pin member engaging with the second tower member and with another one of the plurality of through holes. An amount of slack associated with the strap may be adjusted by engaging either the first pin member or the second pin member with differing through holes of the plurality of through holes extending through the strap.

In certain embodiments, the first tower member may include a first plurality of spaced apart slots extending through the first width of the first tower member, the second tower member may include a second plurality of spaced apart slots extending through the second width of the second tower member. And, the height of the strap relative to the base member may be adjustable by positioning the first and second ends of the strap in different slots of the, respective, first and second pluralities of spaced apart slots.

Aspects of the present disclosure also involve an exercise device including a base member, a pair of tower members extending upward from the base member, and a strap. The base member may include a substantially planar bottom surface, a top surface opposite the bottom surface, and an opening extending through the top and bottom surfaces. The pair of tower members may extend upward from opposite ends of the top surface of the base member. The strap may be releasably secured to each of the pair of tower members at a chosen height and with a chosen amount of slack. The strap may include a support member positioned between a first end and a second end of the strap, wherein the chosen amount of slack of the strap is adjustable by coupling the strap to each of the pair of tower members at different positions on the strap.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 5 is a top plan view of a strap member and the handle of the exercise suspension apparatus of FIG. 1.

FIG. 6 is a side sectional view of the strap member with a through-hole of the exercise suspension apparatus of FIG. 1.

DETAILED DESCRIPTION

Figure 1:
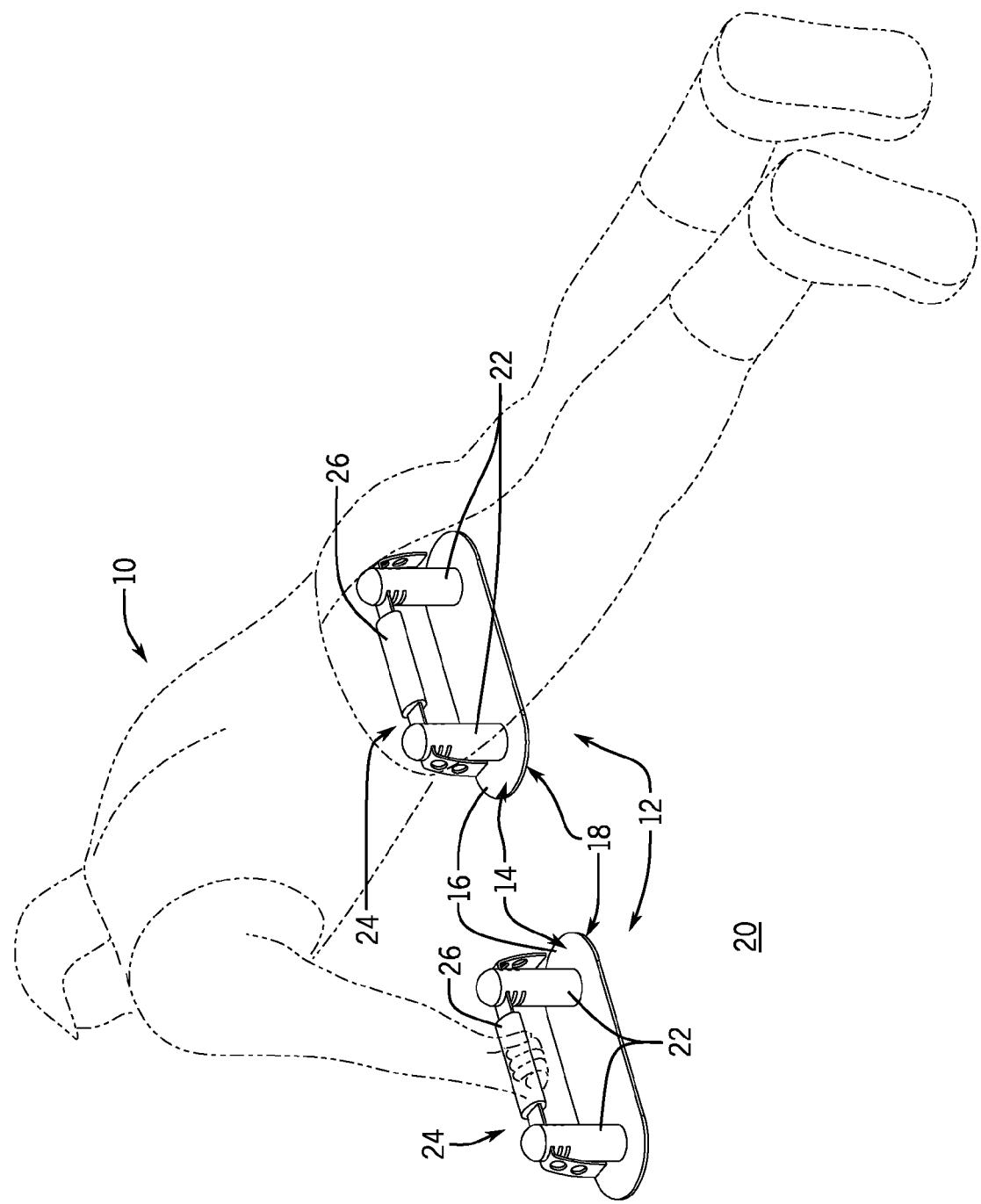
FIG. 1 is a top isometric view of a first embodiment of an exercise suspension apparatus with a user shown in broken line.
Figure 2:
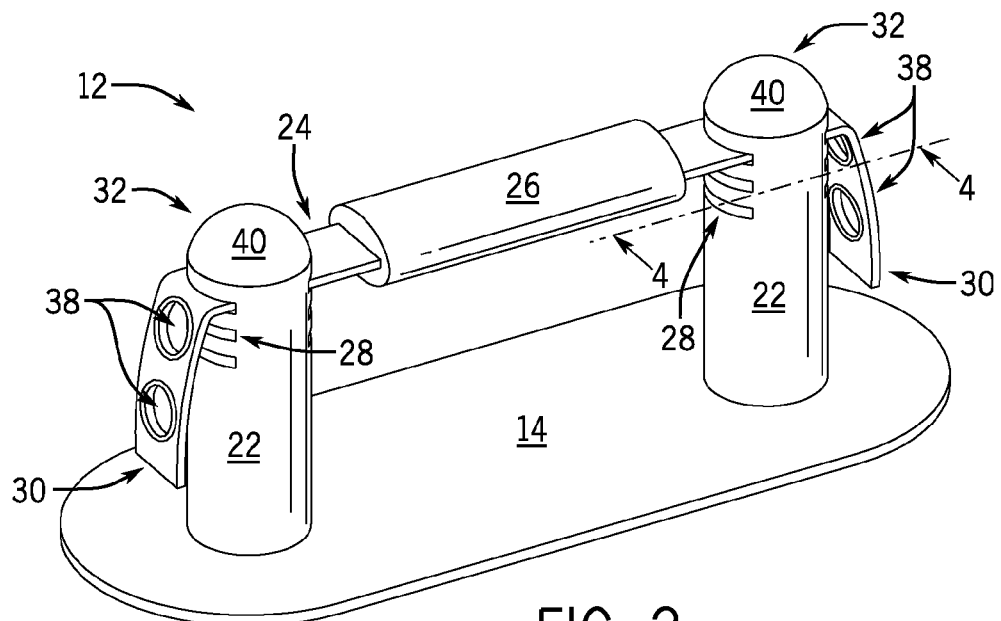
FIG. 2 is an isometric front view of the exercise suspension apparatus of FIG. 1.

Aspects of the present disclosure involve an exercise suspension apparatus that integrates instability into an exercise (e.g., pushup). The instability requires a user to utilize stabilizing muscles that would otherwise not be utilized in the exercise. Reference is initially made to FIG. 1, which is a top isometric view of a user 10 performing an exercise (e.g., pushup) with an exercise suspension apparatus 12 of a first embodiment. As seen in the figure, the exercise suspension apparatus 12 includes a base member or platform 14 that includes a top surface 16 and a bottom surface 18. The top and bottom surfaces 16, 18 of the base member 14 are generally flat, although some contour (e.g. arcuate surface) may be desirable in certain embodiments. The bottom surface 18 is configured to contact a surface such as a floor or gym mat 20 and is configured to support the weight of the rest of the exercise suspension apparatus 12 and the user's weight. The top surface 16 of the base member 14 is coupled with a pair of tower members 22 that extend upward and away from the top surface 16 of the base member 14. In this embodiment, the tower members 22 extend generally perpendicularly from the base member 14, although in other embodiments the tower members 22 may extend upward in other orientations relative to the base member 14. For example, the tower members 22 may extend upwards at an angle (e.g., acute, obtuse) relative to the base member 14. In the embodiments discussed herein, the tower members 22 may extend substantially perpendicularly upward from the base member 14. In this and other embodiments, "substantially perpendicular" may be within about 5, 10, 15, or 20 degrees of perpendicular.

Referring still to FIG. 1, a strap 24 extends between the pair of tower members 22. The strap 24 may include a support member or handle 26 that is free floating on the strap 24 or that is rigidly coupled with the strap 24. As will be discussed later, the strap 24 is adjustable between the two tower members 22 such that an amount of slack can be increased or decreased. In this way, the user 10 may adjust the amount of instability (i.e., amount of slack) that is present for each particular exercise. In general, increasing the amount of slack in the strap 24 between the tower members 22 increases the amount of instability. For a relatively inexperienced user, for example, the user may desire a tauter or less slacked strap 24. For a more experienced user, for example, the user may add more slack to the strap 24, which increases the instability into the exercise. The strap 24 may be a long and generally narrow strip of pliant, bendable, or flexible material such as nylon webbing or similar material.

In certain embodiments, the base member 14 may be about ¼ inch thick. In certain embodiments, the tower members 22 may extend about 6 inches from the bottom of the base member 14. In certain embodiments, the tower members 22 may extend about 6.5 inches from the bottom of the base member 14. In certain embodiments, the tower members 22 may extend about 7 inches from the bottom of the base member 14. In other embodiments, the tower members 22 may extend between about 5 inches and about 8 inches from the bottom of the base member 14. In certain embodiments, the tower members 22 are spaced apart from each other about 7 inches. In certain embodiments, the tower members 22 are spaced apart from each other about 7.5 inches. In certain embodiments, the tower members 22 are spaced apart from each other about 8 inches. In certain embodiments, the tower members 22 are spaced apart from each other about 8.5 inches. In certain embodiments, the tower members 22 are spaced apart from each other about 9 inches. In certain embodiments, the tower members 22 may be spaced apart between about 7 inches and 9 inches.

Figure 3:
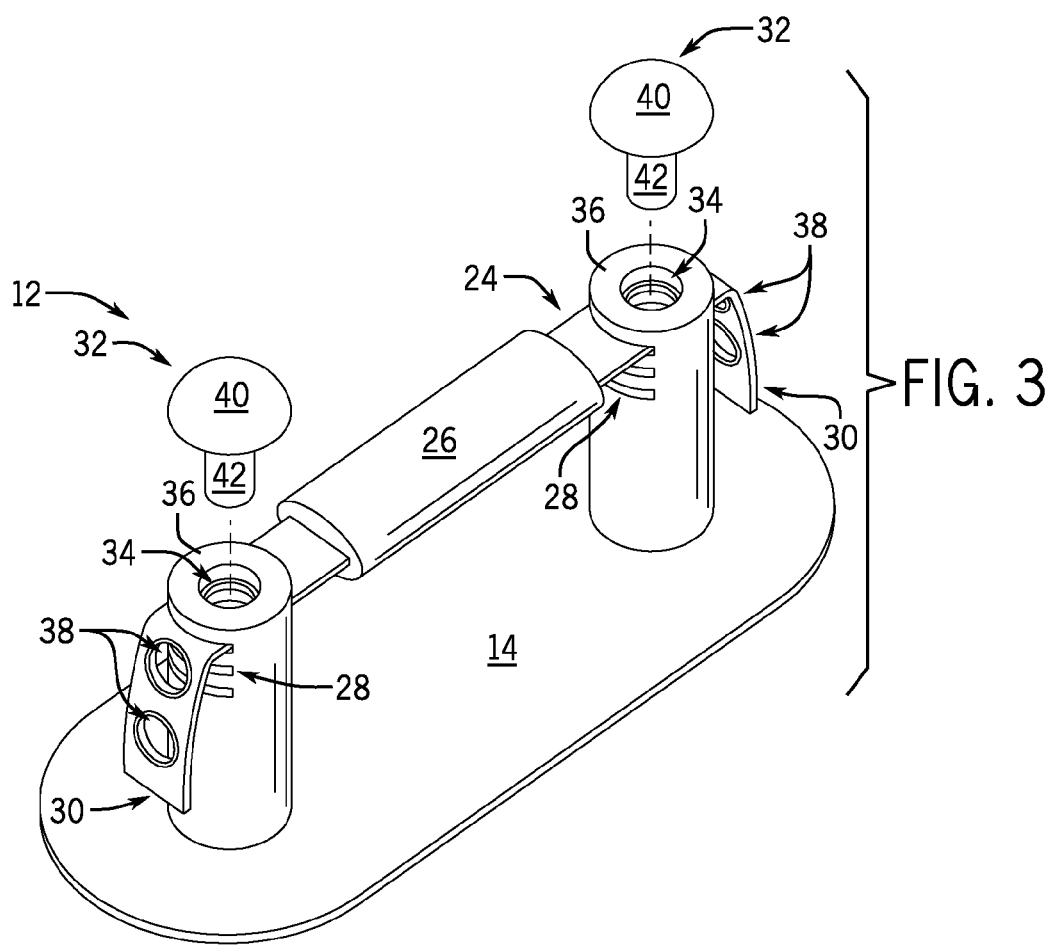
FIG. 3 is an isometric front view of the exercise suspension apparatus of FIG. 1 with a pair of pin members removed from a pair of tower members.
Figure 4:
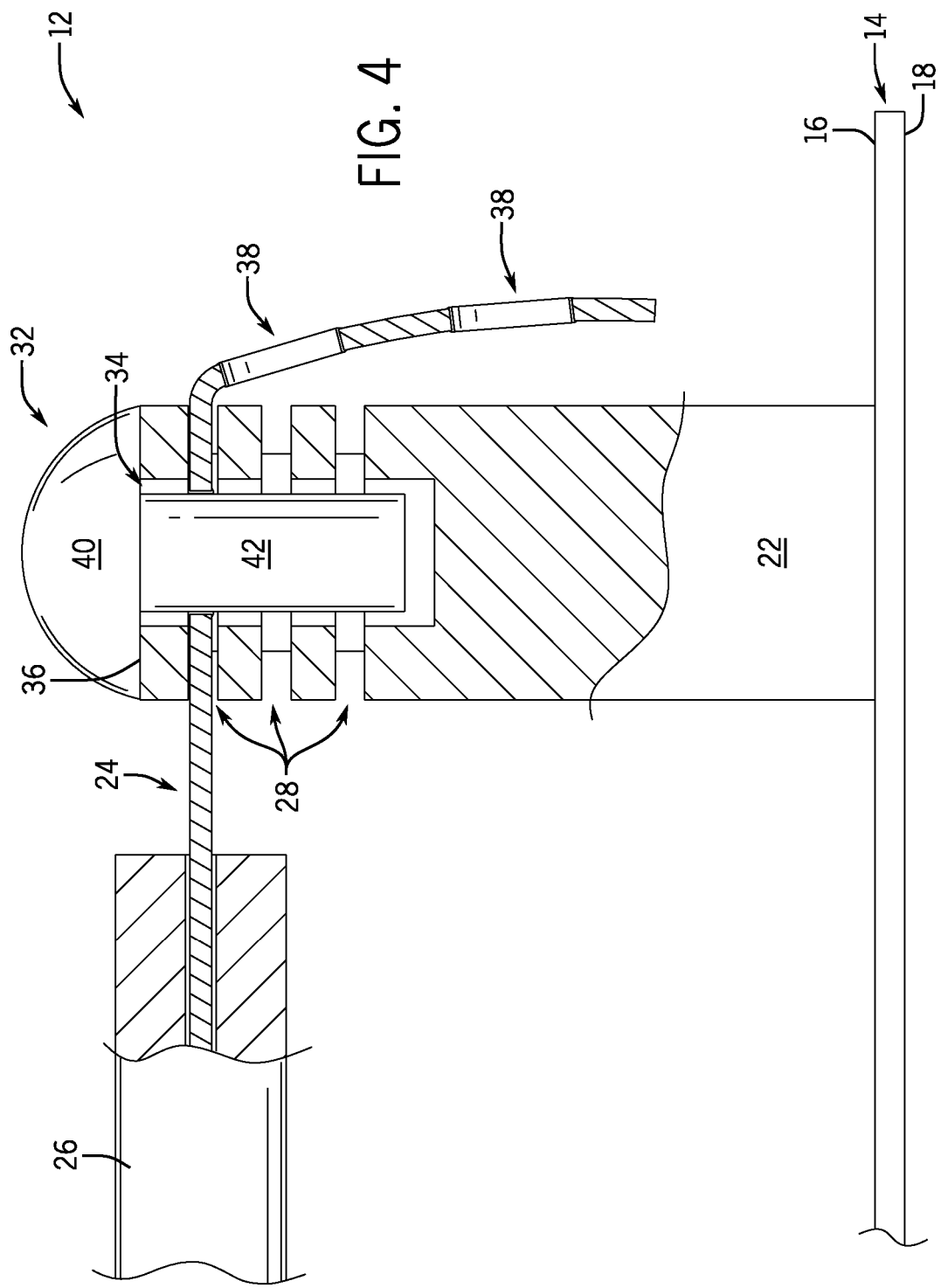
FIG. 4 is a side sectional view of one of the tower members and a portion of a handle of the exercise suspension apparatus of FIG. 1.

Moving on, reference is now made to FIGS. 2-6, which are isometric front views of the exercise suspension apparatus of FIG. 1. In these views, the details of the exercise suspension apparatus 12 become evident. The tower members 22 each include slots 28 that extend through a width of the tower members 22. The strap 24 includes ends 30 that may be inserted through the slots 28 and secured in place by placing a pin member 32 through an opening 34 in a top surface 36 of the tower members 22. As seen in FIG. 3, the pin member 32 includes a head portion 40 and a neck portion 42. The neck portion 42 extends into the opening 34 of the tower member 22 and though one of a variety of through holes 38 in the strap 24. The through holes 38 may be riveted through holes or another type of reinforced through hole. The through holes 38 may be spaced apart any desirable distance and may extend from the ends 30 to the handle 26 and, if the handle is free floating, the through holes 38 may extend the entire length of the strap 24 from end 30 to end 30. In certain embodiments, the through holes 38 may be spaced-apart about ⅜ inch. In certain embodiments, the through holes 38 may be spaced-apart about ½ inch. Once seated in the tower member 22, the pin member 32 may be removed by the user 10 grasping the head portion 40 of the pin member 32 and lifting upward to remove the neck portion from engagement with the through hole 38 and the opening 34 of the tower member 22.

Regarding the slots 28 of the tower members 22, the slots are vertically spaced apart such that a height of the straps 26 may be adjusted. It may be desirable in certain exercises to increase or decrease the height of the straps 26 to achieve a particular result with the exercise. In certain embodiments, the slots 28 are vertically spaced apart about 1 inch. In other embodiments, the slots 28 may be spaced apart about 0.5 inch, 1 inch, or 1.5 inches.

Figure 7:
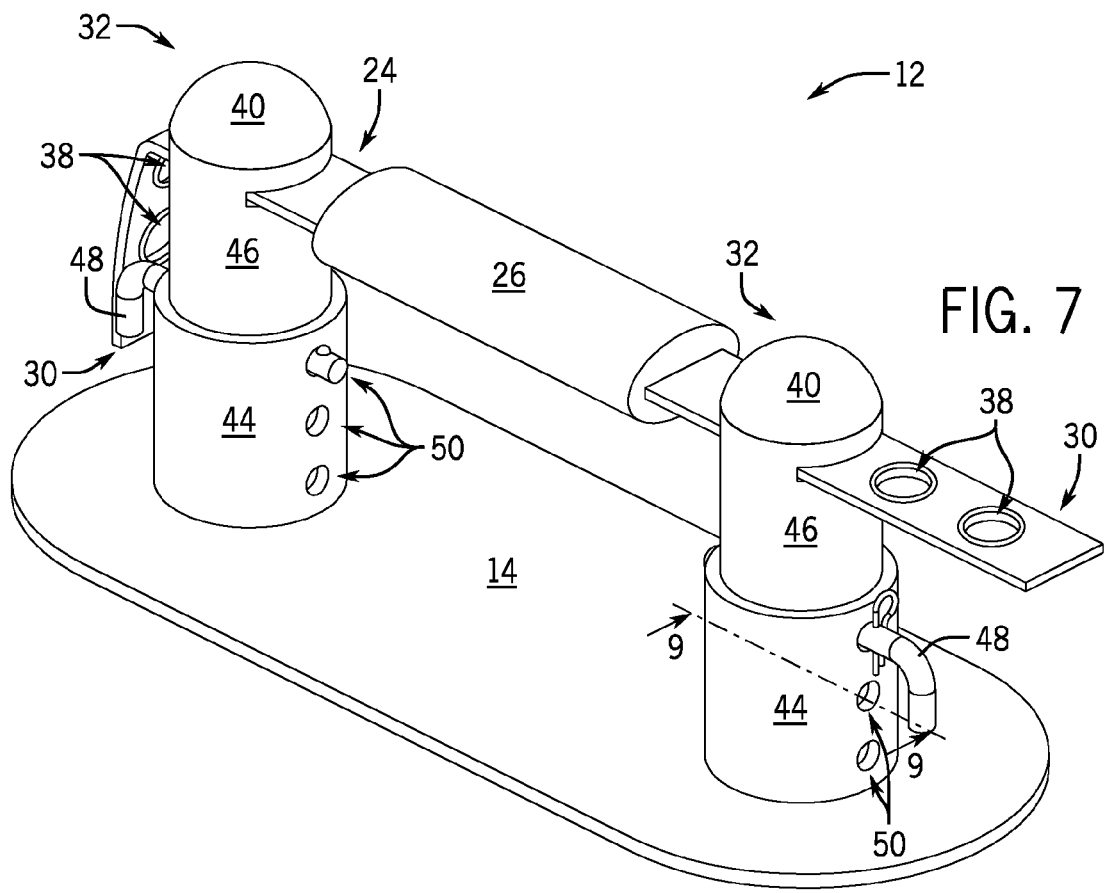
FIG. 7 is a front isometric view of a second embodiment of an exercise suspension apparatus with telescoping tower members.
Figure 8:
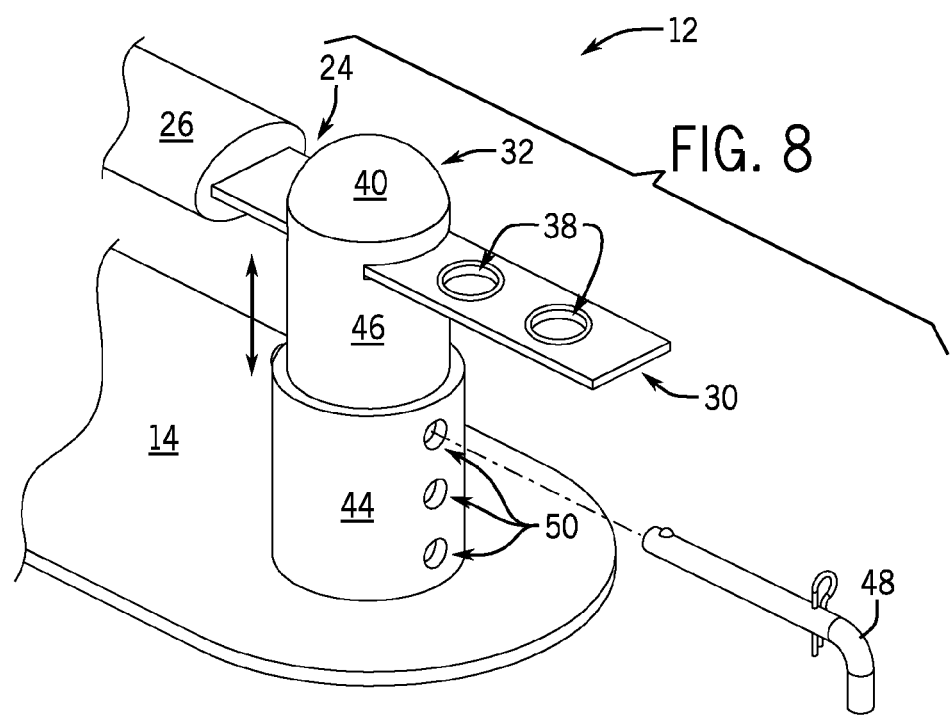
FIG. 8 is a front isometric view of the exercise suspension apparatus of FIG. 7 illustrating adjustment of the telescoping tower members via a pin.
Figure 9:
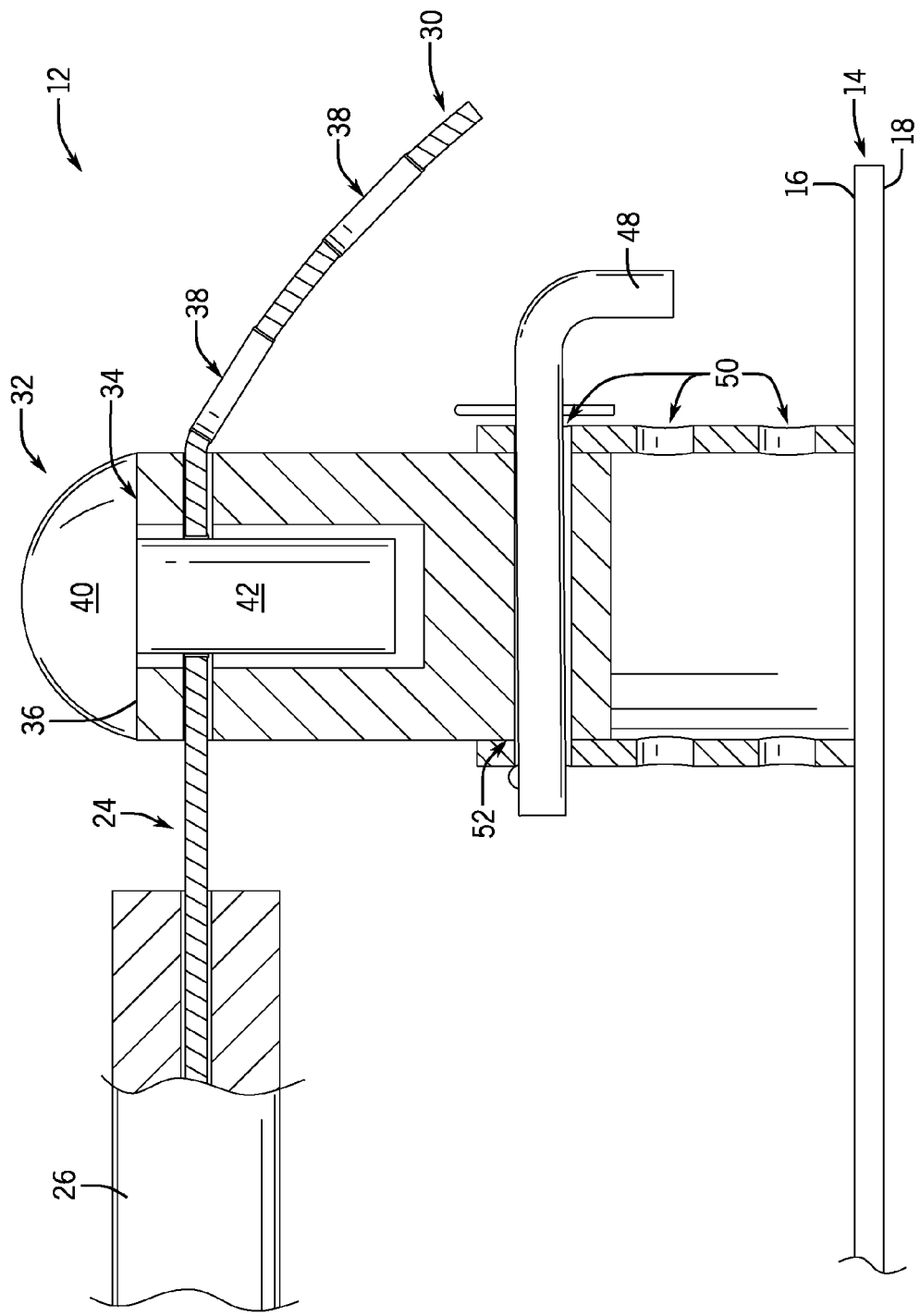
FIG. 9 is a side sectional view of one of the telescoping tower members and a portion of a handle member of the exercise suspension apparatus of FIG. 7.

Although the adjustment of the height of the strap 24 is described by deploying the ends 30 of the strap 24 in slots 28 of different heights, other mechanisms are possible to adjust the height of the strap 24. For example, and referring to FIGS. 7-9, which is a second embodiment of the exercise suspension apparatus 12, the tower members 22 include an outer member 44 that is coupled to the base member 14, an inner telescoping member 46 that vertically translates within the outer member 44, and a weight pin 48 that sets the height of the strap 24. The weight pin 48 is configured to extend through one of a series of height adjustment openings 50 in the outer member 44 and a single adjustment opening 52 in the inner telescoping member 46, as seen in FIG. 9. Each of the openings 50, 52 extend through a width of its respective member such that the weight pin 48 may extend through an entire width of the tower member 22. In operation, the user 10 may coaxially align the single adjustment opening 52 of the inner telescoping member 46 with one of the height adjustment openings 50 in the outer member 44. The user 10 may then extend the weight pin 48 through the coaxially aligned openings 50, 52 to secure the strap 24 at a desired height. The same procedure can be used to adjust a height of the strap 24 on the other tower member 22.

The second embodiment of the tower members 22 includes a single slot 28 on each tower member 28 since the height of the straps 24 can be adjusted via the inner telescoping member 46 relative to the outer member 44. However, the second embodiment could include additional slots 28 to provide for even more height adjustment options.

Referring to FIG. 9, the inner telescoping member 46 is depicted as being solid; however, the member may be tubular.

Figure 10:
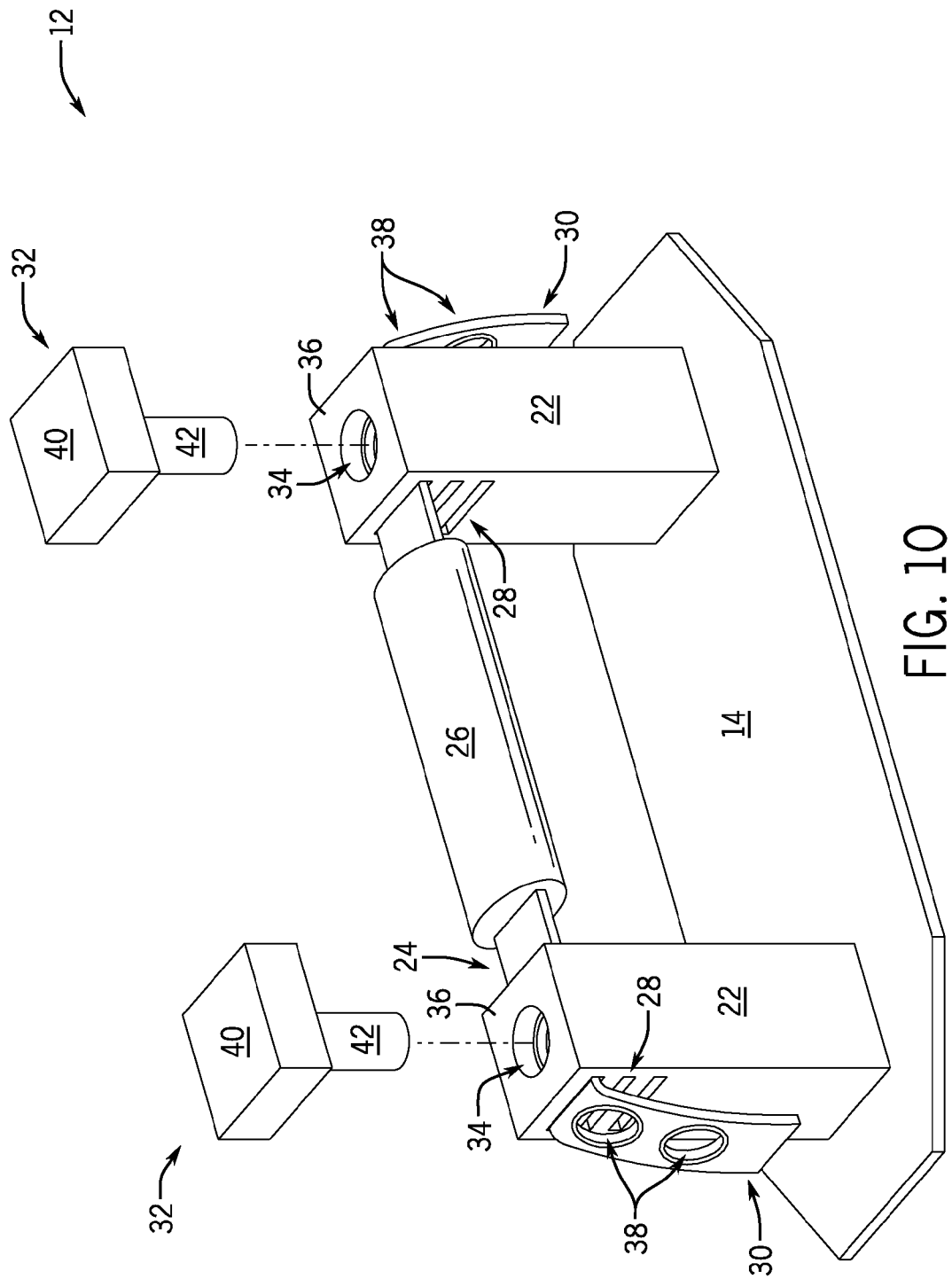
FIG. 10 is a front isometric view of a third embodiment of an exercise suspension apparatus with a pair of pins removed from a pair of tower members.

Moving on to a third embodiment of the exercise suspension apparatus 12, reference is made to FIG. 10. As seen in the figure, the various elements of the exercise suspension apparatus 12 are similar to that of the first embodiment in FIGS. 1-6, however, the base member 14 is octagonal and the tower members 22 and the head portions 40 of the pin members 32 are square. While the shape of the tower members 22, base member 14, and pin members 32 are different, the function of the apparatus 12 is otherwise the same as in the other figures. Similarly, additional embodiments may include tower members 22, base members 14, and/or pin members 32 with oval cross-sections, among other geometric cross-sections.

Figure 11:
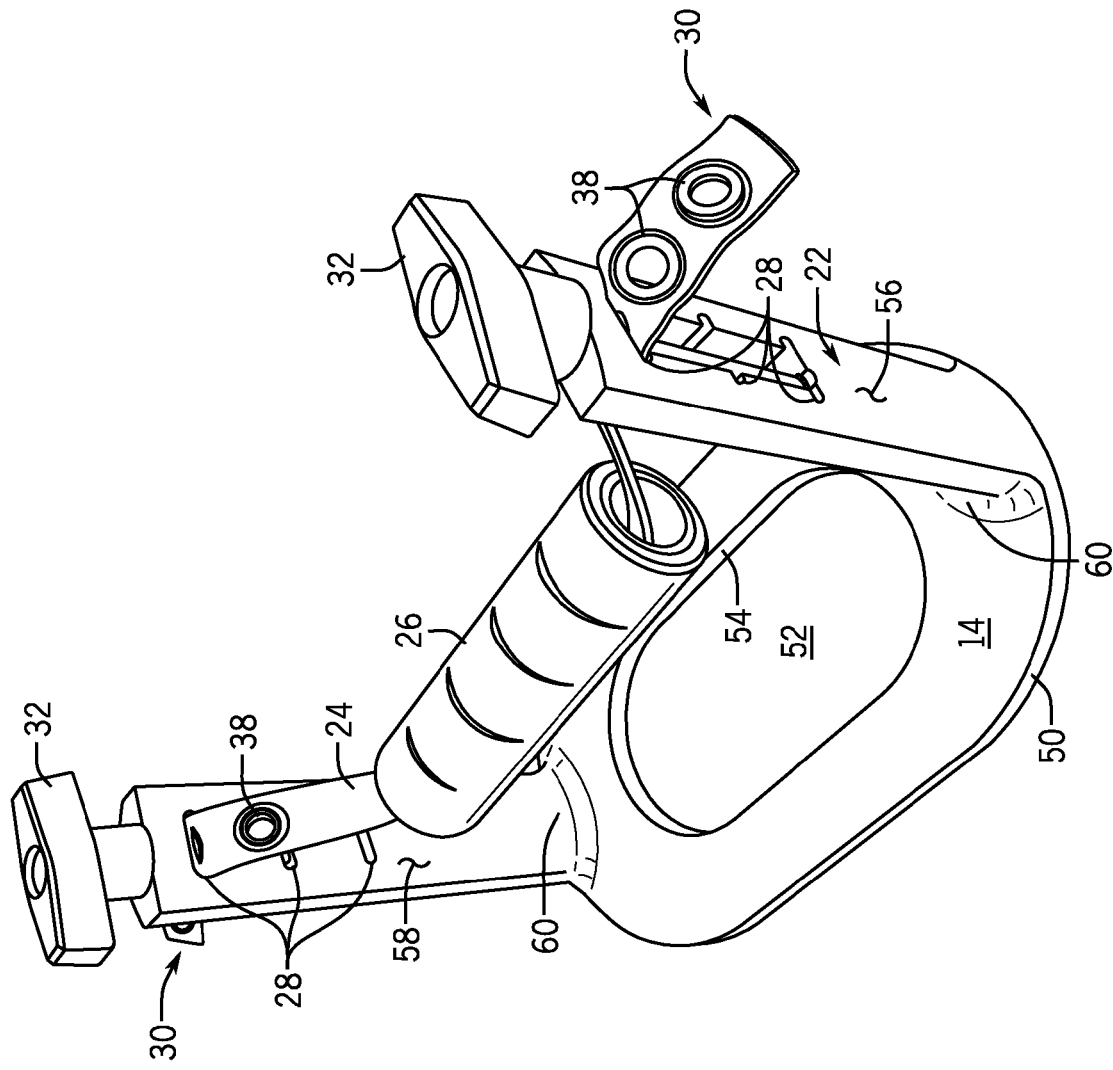
FIG. 11 is a front isometric view of a fourth embodiment of an exercise suspension apparatus with an opening in the base member.

Reference is now made to FIG. 11, which is a fourth embodiment of an exercise suspension apparatus 12. As seen in the figure, the base member 14 includes a stadium-shaped opening 52 extending between the top and bottom surfaces of the base member 14. The opening 52 of the base member 14 is defined by an inner edge 54 that matches a shape of an outer edge 50 of the base member 14. The opening 52 is positioned generally at a midpoint between the tower members 22 and beneath the handle 26 such that a user's hand may extend further towards the base member 14 without coming into contact with the base member 14. In this way, the handle 26 can be lowered further than it could otherwise be lowered if the opening 52 were not present. While the opening 52 is depicted as being stadium-shaped, other shaped openings are possible and contemplated herein.

Still referring to FIG. 11, the tower members 22 extend substantially perpendicularly upward from a top surface of the base member 14 and on opposite ends of the base member 14. The tower members 22 each have an arcuate or rounded outer surface 56 that generally matches a curvature of the outer edge 50 of the base member 14 so that the outer surface and the outer edge 50 are generally coextensive. An inner surface 58 opposite the outer surface 56 is generally a generally flat surface, although a mirror image shape of the arcuate or rounded outer surface 56 is also possible. In either embodiment, the tower member 22 is thickest at a midsection, which is where the opening 34, for receiving the pin 32, atop the tower member 22 is located. As seen in FIG. 11, the tower member 22 is larger at its intersection with the base member 14 to counteract a bending moment of the tower member 22 when a force is applied to the handle 26. This larger area 60 may an additional piece of material that is welded to the tower member or may simply be an enlarged portion of the tower member 22.

In this embodiment, each of the tower members 22 includes three slots 28 for extending the end 30 of the strap 24 therethrough. To couple the strap 24 and the tower members 22, the pins 32 may be positioned in the openings 34 atop the tower members 22 so as to be received within one of the through-holes 38 in the strap 24. The pin 32 may lock in place, be threadably received within the opening 34, or merely be held in place by gravity. As seen in the figure, the outer surface 56 of the tower members 22 partially extend into the opening 34 for the pin 32. The purpose for this may be to easily see the pin 32, stow the end of the strap 24, or otherwise. In this embodiment, there are four through holes 38 extending through each end 30 of the strap 24. There may, however, be a different number of through holes 38.

Features of certain embodiments can be incorporated into other embodiments without limitation. For example, while only the fourth embodiment of the exercise suspension apparatus 12 includes the opening 52 in the base member 14, any other embodiment may include a similar opening 52 in the base member 14.

As far as the materials of construction, the base member 14, tower members 22, and pin members 32 may be made from a steel, aluminum, or suitable alloy to withstand the necessary forces associated with a user 10 performing an exercise with the apparatus 12. Other materials are possible and may include plastics, carbon fibers, or any combination of materials. The strap 24 may be constructed of standard webbings made from nylon or polyester, for example. A width of the strap may be in a range of about 1 inch to about 2 inches and may include a length within a range of about 8 inch to about 18 inches. The strap 24 could be substituted with a rope or band and be similarly secured to the tower members 22. A height of the tower members 22 may be about 6 inches to about 8 inches and the head portion 40 may sit about 1 inch to about 2 inches above a top of the tower members 22. Regarding the tower members 22, they may be spaced apart about 6 inches to about 8 inches. And, while the base member 14 is described with reference to multiple shapes, in general, the base member 14 may include a width of about 8 inches and a length of about 12 inches.

While the exercise suspension apparatus 12 is described as including a handle 26 configured to be grasped by a user's 10 hand, the apparatus 12 may also be used to support a user's 10 lower body. For instance, the apparatus 12 may be additionally, or by itself, be used to support a user's legs while performing an exercise (e.g., pushups). In this way, the user's 10 leg(s) will be suspended and the user 10 will be required to use additional stabilizing muscles to stabilize his or her lower body. In this particular use of the apparatus, a different handle 26 may be used that is tailored to comfortably support the user's 10 legs (e.g., padded support). For example, the handle 26 may include a large diameter foam pad (i.e., similar to a foam roller or "pool noodle") for positioning the user's 10 legs or forearms. Additional embodiments may include a lateral adjustment for one or both tower members 22. As such, the lateral distance between the tower members 22 may be adjusted to be closer or farther away as required for a particular exercise. This lateral adjustment may be helpful to adjust an angle of slack of the strap 24. Such lateral adjustment can be accomplished by any number of methods.

Figure 12:
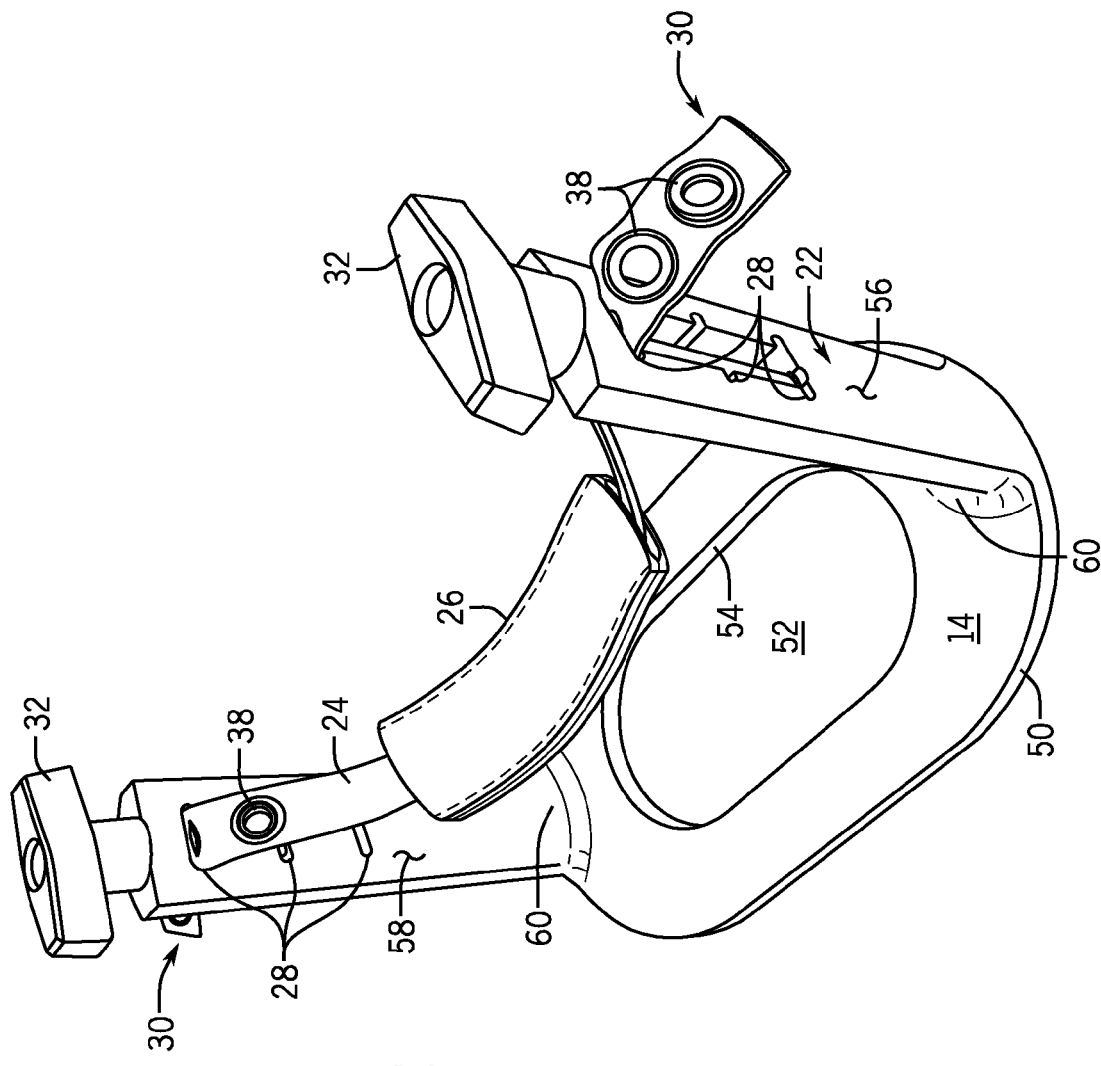
FIG. 12 is a front isometric view of a fifth embodiment of an exercise suspension apparatus with a strap configured for supporting a user's forearms or legs.

The exercise suspension apparatus 12 described herein may additionally be used for planking with or without modification. Planking is a popular isometric core strength exercise that, in certain exercises, involves maintaining a push-up type position while supporting the weight of the user's upper body with the forearms (elbows bent at about 90 degrees) and supporting the weight of the user's lower body by the balls of the feet or the knees. In these types of planking exercise, the suspension apparatus 12 may be used to support the user's 10 forearms, instead the user's hands. When used for planking, among other exercises, the handle or support member 26 may be as shown in FIG. 12, which is an isometric view of the exercise suspension apparatus 12 with an elongated, flat pad 26 as the supporting surface for the user's forearms. As seen in the figure, the pad 26 is rectangular in shape, but may be stadium or pill shaped, as well. The pad 26 includes upper and lower pads that are stitched together along the long ends of the pad 26. The stitching is open on the short ends of the pad 26 so as to create a passageway through the pad 26 for the strap 24 to extend through. The pad 26 may be made from a padded material such as neoprene or other similar materials. In certain embodiments, the pad 26 may include a length on the long end of about 4 inches. In certain embodiments, the pad 26 may include a length on the long end of about 4.5 inches. In certain embodiments, the pad 26 may include a length on the long end of about 5 inches. In certain embodiments, the pad 26 may include a width on the short end of about 3 inches. In certain embodiments, the pad 26 may include a width on the short end of about 3.5 inches. In certain embodiments, the pad 26 may include a width on the short end of about 4 inches.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., top, bottom, front, back) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An exercise device comprising:
   a base member comprising a top surface and a bottom surface and an edge extending between the top surface and the bottom surface;
   a first and a second tower member extending upward from the top surface of the base member, the first tower member comprising a first slot extending through a first width of the first tower member, the second tower member comprising a second slot extending through a second width of the second tower member;
   a first and a second pin member, each pin member comprising a head portion and a neck portion extending from the head portion, the first pin member being removably secured within a first opening on a top portion of the first tower member, the second pin member being removably secured within a second opening on a top portion of the second tower member; and
   a strap comprising a first end and a second end opposite the first end and a plurality of through holes extending through the strap, the first end of the strap configured to be inserted through the first slot and supported by the first tower member via the first pin member engaging with the first tower member and with one of the plurality of through holes, the second end of the strap configured to be inserted through the second slot and supported by the second tower member via the second pin member engaging with the second tower member and with another one of the plurality of through holes, wherein an amount of slack associated with the strap is adjustable by engaging either the first pin member or the second pin member with differing through holes of the plurality of through holes extending through the strap.

2. The exercise device of claim 1, further comprising a handle supported by the strap, wherein the handle is configured to be grasped.

3. The exercise device of claim 2, wherein a height of the strap relative to the base member is adjustable.

4. The exercise device of claim 3, wherein the first tower member comprises a first plurality of spaced apart slots extending through the first width of the first tower member, the second tower member comprises a second plurality of spaced apart slots extending through the second width of the second tower member, wherein the height of the strap relative to the base member is adjustable by positioning the first and second ends of the strap in different slots of the, respective, first and second pluralities of spaced apart slots.

5. The exercise device of claim 1, wherein the first and second tower members extend upward substantially perpendicularly from the base member.

6. The exercise device of claim 5, wherein the first and second tower members extend upward from the base member 6 inches.

7. The exercise device of claim 5, wherein the first and second tower members are parallel to each other and are spaced apart 8 inches.

8. The exercise device of claim 1, wherein the base member includes an opening extending therethrough that is positioned generally at a midpoint between the first and second tower members.

9. The exercise device of claim 8, wherein the opening is stadium-shaped.

10. The exercise device of claim 1, wherein an outer surface of the first and second tower members includes a tower curvature that generally matches a bases curvature of the base member at an outer connection of the first and second tower members with the base member.

11. The exercise device of claim 1, wherein the strap is a constructed of a pliant material.

12. An exercise device comprising:
a base member comprising a substantially planar bottom surface, a top surface opposite the bottom surface, and an opening extending through the top and bottom surfaces;
a pair of tower members extending upward from opposite ends of the top surface of the base member; and
a strap releasably secured to each of the pair of tower members at a chosen adjustable height and with a chosen amount of slack, the strap comprising a support member positioned between a first end and a second end of the strap, wherein the chosen amount of slack of the strap is adjustable by coupling the strap to each of the pair of tower members at different positions on the strap.

13. The exercise device of claim 12, wherein the strap further comprises a first plurality of through holes near the first end and a second plurality of through holes near the second end.

14. The exercise device of claim 13, wherein pins secure the strap to the pair of tower members.

15. The exercise device of claim 14, wherein the pins engage with a topside of the tower members to secure the strap to the pair of tower members.

16. The exercise device of claim 12, wherein the pair of tower members extend upward and substantially perpendicularly from the base member.

17. The exercise device of claim 16, wherein the support member is an elongated and flat pad configured to support a user's forearms or legs.

18. The exercise device of claim 12, wherein the opening is positioned between the pair of towers.

19. The exercise device of claim 12, wherein each of the pair of tower members includes vertically spaced apart slots for positioning the strap therein and selecting the chosen height.

20. The exercise device of claim 12, further comprising a pair of pins configured to secure the strap to the pair of tower members.

* * * * *